United States Patent [19]
Baker

[11] Patent Number: 5,816,313
[45] Date of Patent: Oct. 6, 1998

[54] PUMP, AND EARTH-TESTABLE SPACECRAFT CAPILLARY HEAT TRANSPORT LOOP USING AUGMENTATION PUMP AND CHECK VALVES

[75] Inventor: David Baker, Hamilton Square, N.J.

[73] Assignee: Lockheed Martin Corporation, Sunnyvale, Calif.

[21] Appl. No.: 201,733

[22] Filed: Feb. 25, 1994

[51] Int. Cl.[6] .................................................. F28F 27/00
[52] U.S. Cl. ................. 165/41; 165/104.23; 165/104.26; 165/104.24; 417/65; 251/65; 137/519.5
[58] Field of Search ............................. 165/911, 104.26, 165/104.22, 104.21, 41, 104.31, 104.24, 104.27, 104.23, 32; 417/543, 65; 137/533.11, 519.5, 606, 558; 257/285; 251/65; 62/115

[56] References Cited

U.S. PATENT DOCUMENTS

| | | | |
|---|---|---|---|
| 3,053,198 | 9/1962 | Staehle et al. | 103/255 |
| 3,520,330 | 7/1970 | Szwargulski | 137/533.11 |
| 3,677,336 | 7/1972 | Moore, Jr. | 165/104.24 |
| 3,898,017 | 8/1975 | Mandroian | 417/65 |
| 4,076,464 | 2/1978 | Pinney | 417/543 X |
| 4,120,172 | 10/1978 | Pierce | 62/115 |
| 4,312,402 | 1/1982 | Basiulis | 165/104.22 |
| 4,454,259 | 6/1984 | Pirkle | 137/558 X |
| 4,669,496 | 6/1987 | Kemp et al. | 137/606 X |
| 4,869,313 | 9/1989 | Fredley | 165/41 |
| 4,899,810 | 2/1990 | Fredley | 165/41 |
| 4,921,041 | 5/1990 | Akachi | 165/104.26 |
| 4,957,157 | 9/1990 | Dowdy et al. | 165/104.27 |
| 5,103,897 | 4/1992 | Cullimore et al. | 165/41 X |
| 5,203,399 | 4/1993 | Koizumi | 165/104.33 |
| 5,257,660 | 11/1993 | Cargile | 165/104.22 |

FOREIGN PATENT DOCUMENTS

| | | | |
|---|---|---|---|
| 0024795 | 6/1984 | Japan | 165/104.27 |
| 4335991 | 11/1992 | Japan | 165/96 |

OTHER PUBLICATIONS

"Development of a Rugged Hybrid Two–Phase Transport Loop", by Baumann et al., published by American Institute of Aeronautics.
Astronautics, No. AIAA 92–2866, published Jul. 6–8, 1992 at the AIAA 27th Thermophysics Conference, Nashville, TN.

*Primary Examiner*—Ira S. Lazarus
*Assistant Examiner*—Christopher Atkinson
*Attorney, Agent, or Firm*—W. H. Meise; S. A. Young; L. B. Wegemer

[57] ABSTRACT

A spacecraft includes heat-generating payload equipment, and a heat transport system with a cold plate thermally coupled to the equipment and a capillary-wick evaporator, for evaporating coolant liquid to cool the equipment. The coolant vapor is coupled to a condenser and in a loop back to the evaporator. A heated coolant reservoir is coupled to the loop for pressure control. If the wick is not wetted, heat transfer will not begin or continue. A pair of check valves are coupled in the loop, and the heater is cycled for augmentation pumping of coolant to and from the reservoir. This augmentation pumping, in conjunction with the check valves, wets the wick. The wick liquid storage capacity allows the augmentation pump to provide continuous pulsed liquid flow to assure continuous vapor transport and a continuously operating heat transport system. The check valves are of the ball type to assure maximum reliability. However, any type of check valve can be used, including designs which are preloaded in the closed position. The check valve may use any ball or poppet material which resists corrosion. For optimum performance during testing on Earth, the ball or poppet would have neutral buoyancy or be configured in a closed position when the heat transport system is not operating. The ball may be porous to allow passage of coolant vapor.

15 Claims, 3 Drawing Sheets

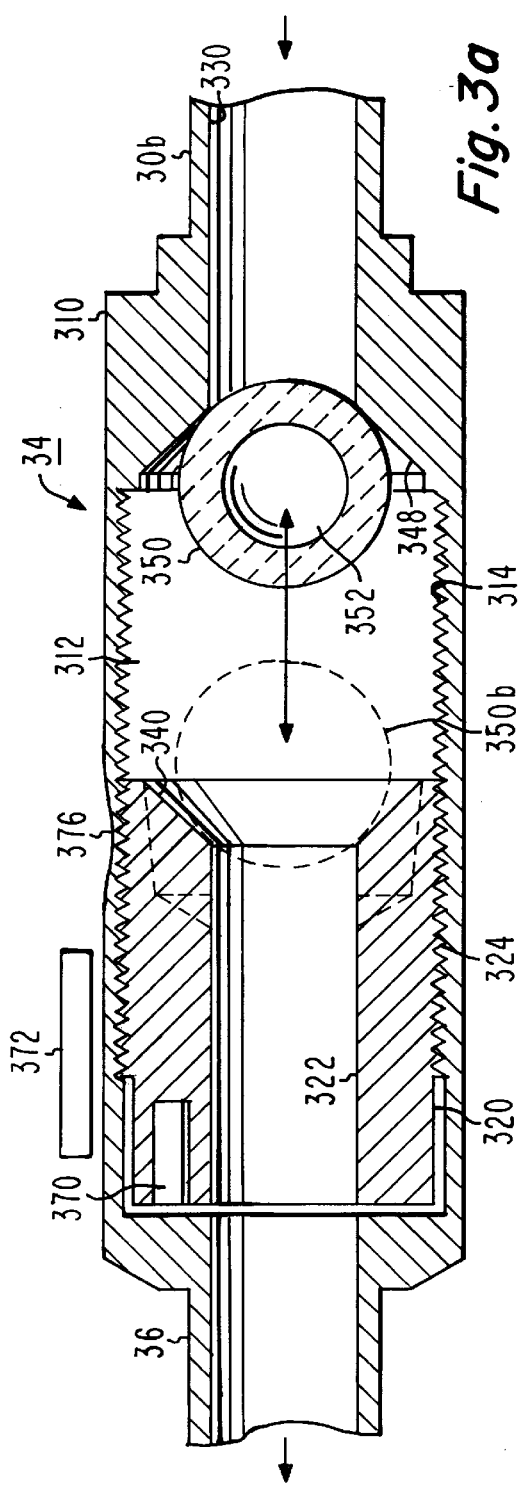
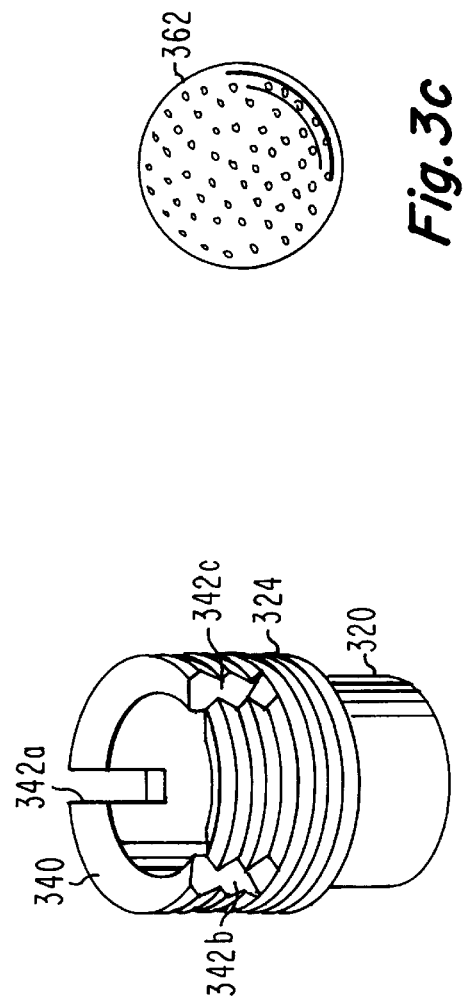

PUMP, AND EARTH-TESTABLE SPACECRAFT CAPILLARY HEAT TRANSPORT LOOP USING AUGMENTATION PUMP AND CHECK VALVES

The Government has rights in this invention pursuant to NASA contract NAS 5-32500.

FIELD OF THE INVENTION

This invention relates to heat transport systems, and particularly to capillary pumped heat transfer loops for use in aerospace or spacecraft applications, including augmentation or auxiliary pumps to provide fluid transport and rapid start-up, and to prevent depriming, and using check valves which allow loop testing in a gravity environment.

BACKGROUND OF THE INVENTION

The power-generating and power-handling capabilities of aerospace equipment, and spacecraft in particular, are constantly increasing, as commercial requirements become greater. Such requirements include the need for a larger number of channels in communications satellites, and for higher transmitted power per channel to improve the received signal-to-noise ratio. Earth sensing spacecraft are required to carry more instruments, and the instruments themselves consume more power as their capabilities increase. The supply of electrical power is being met by increasing the area of the solar panels which generate electricity for the spacecraft. The electrical power for such spacecraft ultimately becomes heat, which must be rejected from the spacecraft in order to maintain its temperature. The higher power generation and consumption thus introduces a concomitant requirement for higher power rejection capability.

In some spacecraft, it may be desirable to mount electrical payload equipment on a "cold plate", and to convey heat away from the cold plate by way of a heat transport system (HTS). One type of heat transport system is the capillary pumped heat transport system (CPHTS), which is a two-phase system described, for example, in U.S. Pat. No. 4,899,810, issued Sep. 26, 1989 in the name of Fredley, incorporated herein by reference. In the Fredley '810 system, a capillary pump circulates coolant in a loop between (a) a wicked evaporator thermally coupled to a cold plate, to which spacecraft payload electronics are mounted, and which uses the payload heat to evaporate liquid coolant into coolant vapor, and (b) a plurality of paralleled condensers, each of which includes a heat exchanger, for condensing the coolant vapor to a liquid form. As also described therein, it is very advantageous to be able to test the cooling system in a gravity environment, and have the system operate in the same manner in a microgravity environment. The Fredley '810 system includes a liquid coolant reservoir coupled to the liquid line, for system pressure and fluid inventory control. As described in the '810 patent, the heat exchanger is made with a plurality of small, helical channels, which imparts forces which tend to cause the location of fluid to be the same in a gravity and microgravity environment.

U.S. Pat. No. 4,869,313, issued Sep. 26, 1989 in the name of Fredley, incorporated herein by reference, describes a heat exchanger which receives coolant liquid on one side of a porous tube, and couples heat to be rejected by way of an auxiliary fluid or working fluid to the surface of the porous tube, which absorbs heat from the auxiliary fluid by evaporation of coolant liquid into coolant vapor. The working fluid, in turn, is coupled to the cold plate to which the spacecraft payload heat generators are coupled. The system pressure in a closed-loop cooling system depends upon the temperature of the system, and this in turn affects the relative volumes of the liquid and vapor phases. U.S. Pat. No. 4,957,157, issued Sep. 18, 1990 in the name of Dowdy et al., incorporated herein by reference, describes a fluid reservoir for use in a closed-loop two-phase cooling system, which is controlled by heating, for controlling the pressure of the two-phase cooling system in a spacecraft environment. As noted therein, a capillary-pumped fluid heat transport system is very advantageous for spacecraft use because it contains no mechanical moving parts, which statistically enhances system reliability, but its disadvantage is that it develops a very small head (pumping pressure), on the order of one pound per square inch (1 PSI). The amount of heat which a heat transfer loop can transfer depends in part upon the flow rate of the coolant fluid, and when the head is small, maintaining a high flow rate requires that the fluid path be relatively unrestricted. As a result, the system design is constrained by the requirement for low resistance to fluid flow. The low head produced by a capillary pumped system, in conjunction with the relatively unrestricted flow paths, can, under certain conditions, lead to reverse flow of coolant, which in turn can result in depriming of the capillary system. In short, when deprimed, the capillary wick is not wetted by the liquid coolant, application of heat to the wick does not result in generation of coolant vapor, and capillary pumping ceases. This condition is known as a "deprime" condition. When deprimed, a capillary heat transport loop cannot transfer heat, heat source cooling will stop and the heat source temperature will rise rapidly unless the heat source power is reduced or disabled. The causes of depriming are not well understood, but depriming and start-up problems have been experienced many times during ground testing and micro-gravity shuttle testing.

A hybrid capillary heat transport loop including a mechanical auxiliary or augmentation pump is described in an article entitled, "*Development of a Rugged Hybrid Two-Phase Transport Loop*", by Baumann et al., published by *American Institute of Aeronautics and Astronautics*, No. AIAA 92-2866, published Jul. 6–8, 1992 at the AIAA 27$^{th}$ Thermophysics Conference, Nashville, Tenn., incorporated herein by reference. The augmentation pump, in the capillary cooling system therein described, can be operated when the capillary wick is deprimed, to reprime the system by pumping liquid coolant to the wick until the wick is saturated. The tests with the mechanically pumped rugged hybrid two-phase transport loop described in the Baumann et al. article demonstrated improved system heat transport capability, the elimination of start-up problems, autonomous deprime correction and system insensitivity to vapor generation at the evaporator inlet. As described by Baumann et al., conventional capillary pumped heat transport systems deprime if vapor or non-condensible gas accumulates at the capillary wick inlet. Sealed heat pipes used to transport heat may continue to function in the presence of non-condensible gas, because the non-condensible gas accumulates at one end of the heat pipe without impacting the regions free of the non-condensible gas. However, the generation, migration and impact of non-condensible gas within a capillary pumped heat transport system is not well understood. The pressure generated by a mechanical pump is known to have the ability to condense vapor bubbles and to force non-condensible gas through typical capillary wick materials. The mechanically pumped rugged hybrid two-phase transport loop described in the Baumann et al. paper provides the advantages of increasing and controlling the pumping pressure within a capillary pumped heat transport systems and allows improved heat transport capacity to weight ratio. However, the described hybrid system is limited by the use of a conventional mechanical pump which restricts long term system life and reliability, and the impedance of the pump to fluid flow also reduces capillary-pumped action when the mechanical pump is not operating.

SUMMARY OF THE INVENTION

An improved capillary heat transport system includes a thermal augmentation pump to increase the system pumping pressure performance without impeding capillary-pumped fluid flow. The invention provides a simple and reliable method of providing the benefits of the mechanical pump and improves system reliability. In a two-phase cooling system, the high ratio of liquid density to vapor density allows the augmentation pump to displace liquid by the generation of a small quantity of vapor.

A liquid pumping arrangement includes a source of liquid which has a liquid output port, and a utilization apparatus which has a liquid input port, and which under some conditions may itself develop a tendency to pump. A controllable coupling arrangement is coupled to the source of liquid and to the utilization apparatus, for coupling liquid from the source of liquid to the utilization apparatus, and which, in one mode of operation, is controllable for pumping liquid from the source of liquid to the utilization apparatus. The coupling arrangement includes an enclosure or pipe for the flow of liquid between the source of liquid and the utilization apparatus. The coupling arrangement also includes a pump, which includes a fluid reservoir with an input/output port, which is coupled to the pipe at a first location lying between the source of liquid and the utilization apparatus. Such fluid reservoirs are conventionally used in capillary pumped systems for pressure control. When heated, the reservoir rejects liquid into the pipe at the location, and, when cooled, withdraws liquid from the pipe. A first check valve is coupled in the pipe at a second location, which lies between the first location and the utilization apparatus, and is oriented for allowing flow of liquid through the pipe in a direction toward the utilization apparatus, and for blocking flow of liquid from the utilization apparatus toward the first location. A second check valve is coupled to allow fluid flow from the source of liquid toward the first location, and to block fluid flow from the first location toward the source of liquid. The coupling arrangement also includes a heat control coupled to the reservoir for controllably heating or relatively cooling the reservoir. During a heating cycle, liquid is rejected from the reservoir into the pipe at the first location, whereby liquid tends to be driven through the first check valve toward the utilization apparatus, and, during a cooling cycle, liquid is withdrawn from the pipe, whereby the first check valve tends to close and the second check valve to open, thereby tending to draw liquid toward the first location from the source of liquid, whereby successive heating and cooling cycles tends to develop a fluid pressure which tends to pump the liquid toward the utilization apparatus, and whereby, when the utilization apparatus pumps, the first and second check valves open to allow liquid to flow toward the utilization apparatus. In one embodiment of the invention, the utilization apparatus is a capillary-wick type heat absorber, which cools a cold plate or heat sink by evaporating coolant liquid to form coolant vapor, thereby generating the pumping head. In an embodiment particularly adapted for use in a spacecraft and for testing on Earth, the check valve(s) are ball-type, and the mass density of the ball is made equal to the mass density of the coolant, so that the ball neither "floats" nor "sinks", but instead has neutral buoyancy, and performs the same in a gravity environment as in a microgravity environment. To prevent loss of coolant, the coolant vapor from the utilization cold plate apparatus is circulated to the source of liquid, in which it is cooled and condensed back into liquid form.

DESCRIPTION OF THE DRAWINGS

FIG. 3a is a simplified cross-sectional view of a first form of check valve usable in the arrangement of FIG. 1a, with a neutral buoyancy ball and a magnetically actuated deadband adjustment, FIG. 3b is a perspective or isometric view of a seat arrangement which may be used in the check valve of FIG. 3a, and FIG. 3c is a representation of a porous ball which may be used in the check valve of FIG. 3a.

DESCRIPTION OF THE INVENTION

Figure 1A:
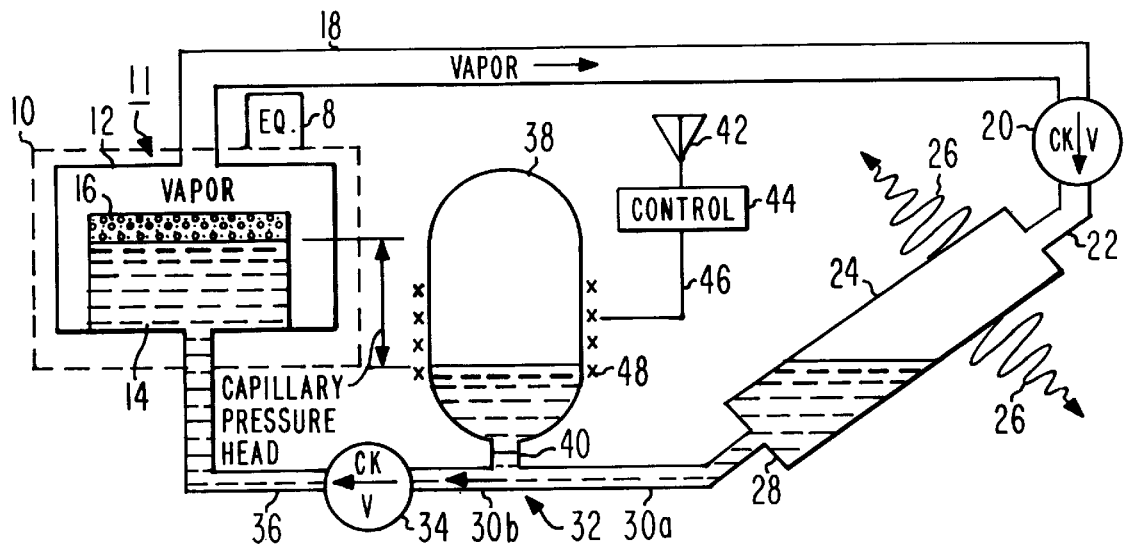
FIG. 1a is a simplified schematic representation of a capillary pumped cooling loop, with an augmentation pump including check valves according to an aspect of the invention, with liquid levels suggesting normal capillary pumping operation.

In FIG. 1a, a cold plate 10 has heat-generating equipment (Eq), such as spacecraft payload equipment represented by a block 8 mounted thereon, and couples the heat to an evaporator 11, through its housing 12, to a wick 16 associated with a coolant liquid supply tube 14. At the liquid level illustrated in FIG. 1a, wick 16 is wetted by the liquid coolant, and absorbs heat from cold plate 10. The absorbed heat is transferred to the coolant liquid which saturates the wick, and coolant vapor is formed in the chamber defined by housing 12. The heat-laden coolant vapor flows through a path illustrated as a pipe 18, and through a check valve 20, oriented for fluid flow in the direction of the arrow, to the vapor input port 22 of a heat exchanger or condenser 24. The coolant vapor enters heat exchanger 24, and heat is extracted from the coolant vapor, in known fashion, to condense the coolant vapor to liquid coolant form, and then to supercool the coolant liquid. The heat leaving heat exchanger or condenser 24 is represented by a photon symbol 26. The supercooled liquid coolant produced by heat exchanger or condenser 24 leaves by a liquid coolant port 28, and enters a path or pipe 30a. The supercooled liquid coolant passes a tee junction at a location 32, through a further path or pipe 30b and a check valve 34, and returns to coolant liquid supply tube 14 of evaporator 11 through a path or pipe 36. A fluid reservoir 38 has a fluid input/output port 40 coupled to paths or pipes 30a and 30b at junction point or juncture 32. The combination of closed vessels 12 and 24, and paths 18, 30a, 30b and 36, and check valves 20 and 34, forms a closed loop for the flow of coolant in the direction indicated by the arrows associated with the check valves.

Also illustrated in FIG. 1a is an antenna 42, which is commonly found on spacecraft for communications and control of the spacecraft, and a control block 44, coupled to antenna 42 and, by a path 46, to heaters, illustrated by Xs 48, associated with fluid reservoir 38. The heaters may be located on the exterior of fluid reservoir 38, as known in the art, and the interior of the reservoir may, as suggested in the abovementioned Dowdy et al. patent, include wick material adjacent the locations of the heaters.

In normal operation of the arrangement of FIG. 1a, wick 16 of evaporator 11 absorbs heat from cold plate 10, which thereupon cools the payload equipment represented as 8. The coolant vapor generated by wick 16 generates a head, albeit small, which results in a flow of coolant vapor through path 18 and check valve 20, in its open state, to condenser 24. Condenser 24 cools the vapor to liquid form, and then supercools the liquid coolant, extracting the heat added at the cold plate in the process, and couples the supercooled liquid coolant through path 30a, past junction 32, through path 30b and check valve 34 in its open state, and back to liquid supply pipe 14. The system pressure and temperature may be monitored by sensors (not illustrated), which transmit the information to an Earth station, where the state of the heat transfer loop may be evaluated. If the result of the evaluation indicates that more or less liquid coolant is needed in the heat transfer loop, signals may be transmitted from the Earth station, by way of antenna 42 to control block 44, to command the application of more or less heat to resistance heaters 48 associated with reservoir 38, to reject liquid coolant from the reservoir into the loop, or to withdraw coolant therefrom. It should be understood that in space, there is no gravity to equalize liquid levels in evaporator 11, reservoir 38, or condenser 24, so the illustrated levels represent the conditions in a gravity environment.

Figure 1B:
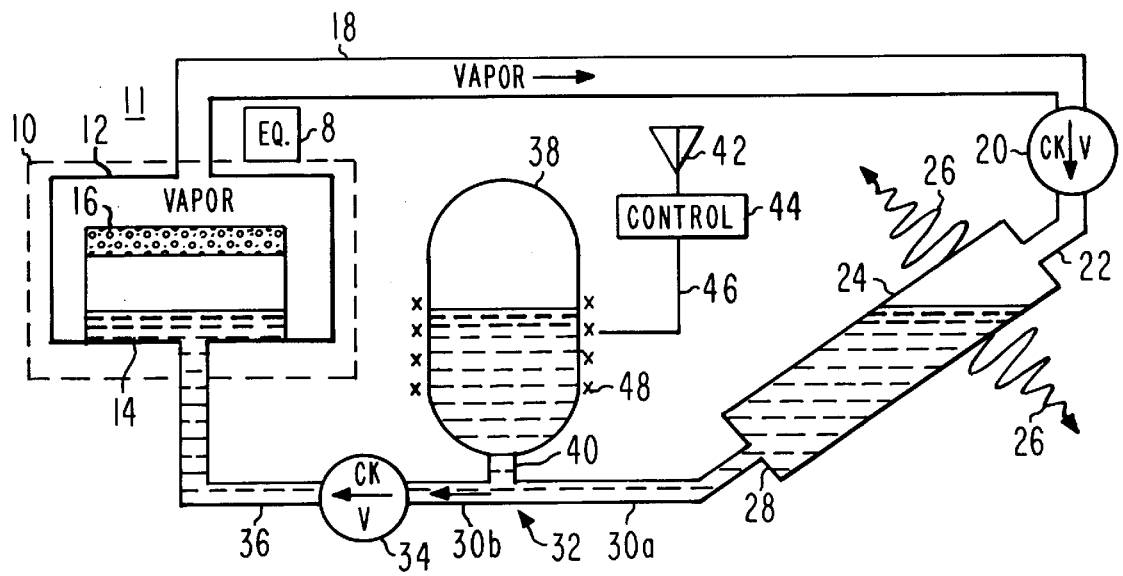
FIG. 1b is similar to FIG. 1a, with liquid levels suggesting depriming.

In FIG. 1b, as a result of changes in the heat generated by the payload equipment, changes in the amount of heat rejected by condenser 24, or other conditions, which as mentioned are not well understood, the liquid coolant level is illustrated as being lower than in the case in FIG. 1a, so that wick 16 of evaporator 11 is not wetted, the system is deprimed, and capillary pumping cannot take place. The control available in prior-art systems under these conditions is limited, but, as described below, the system according to the invention can be reprimed.

Figure 2:
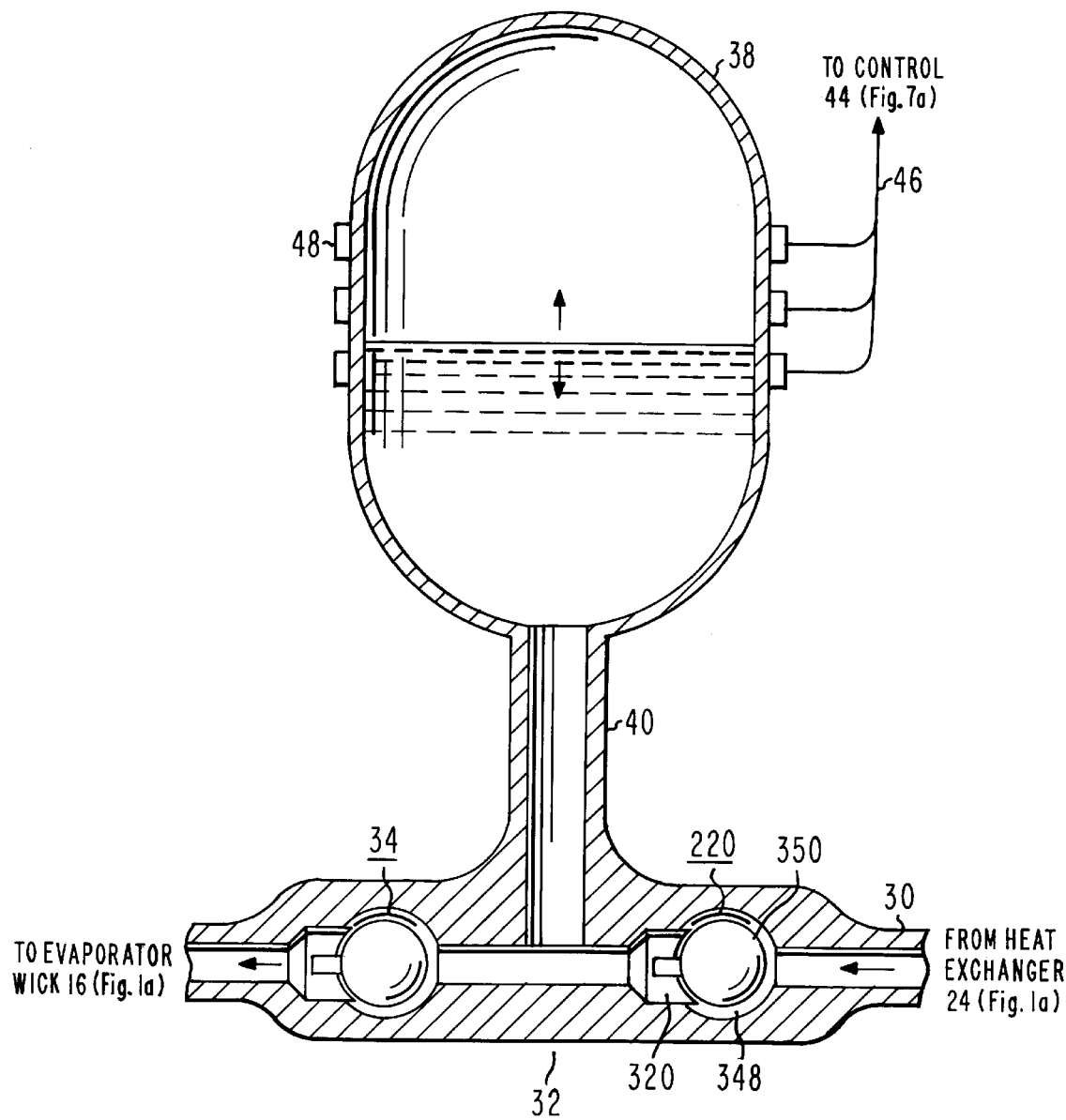
FIG. 2 is a simplified representation of the augmentation pump portion of a system similar to that of FIGS. 1a and 1b, with an alternative check valve location.

As mentioned, fluid reservoir 38 of FIGS. 1a and 1b is provided in the prior art for control of the system pressure, and, as described in the abovementioned Dowdy et al. patent, may include electrical heaters for heating the fluid therein, for tending to increase the volume of the vapor component of the coolant therein, for creating a pressure differential which results in rejecting fluid from the reservoir into the heat transfer loop, and may also be arranged for enhanced radiation to space in order to provide what amounts to cooling, for cooling the fluid in the reservoir, to tend to reduce the volume of the vapor component of the coolant, and reducing the pressure to cause the reservoir to withdraw liquid coolant from the heat transfer loop. Referring to FIG. 2, reservoir 38, in conjunction with check valve 34 and another check valve 220, not only performs the abovementioned control of system pressure, but also acts as an augmentation or auxiliary pump, which can be operated to pump liquid coolant toward the wick of the evaporator of the cold plate arrangement. It should be noted that check valve 220 of FIG. 2 may differ from check valve 20 of FIGS. 1a and 1b only by virtue of its location in fluid path 30b between junction point 32 and heat exchanger 24, and either location is believed to be acceptable.

In operation, when a deprimed condition, such as that illustrated in FIG. 1b, is imminent or actually exists, commands are transmitted from the associated Earth station to control block 44 of FIG. 1a, commanding cyclical application of heating and relative cooling of reservoir 38. Control block 44 responds by applying electrical energy to heaters 48 for a period of time, followed by a period of relative cooling, without the application of heat. This results in cyclical rejection of liquid coolant from reservoir 38, through fluid path 40 to junction 32, followed by withdrawal of fluid from junction 32 into reservoir 38. During each portion of the cycle in which liquid coolant is rejected from the reservoir, check valve 220 closes, and check valve 34 opens, to allow the rejected liquid coolant to flow toward evaporator wick 16. When the next following cooling cycle begins, and the pressure at junction 32 decreases slightly, check valve 34 closes, and check valve 220 opens, to allow liquid coolant to flow from heat exchanger 24, through path 30, and check valve 220, past junction 32 and into the reservoir. This allows the reservoir to replenish its supply of liquid coolant. After a sufficient time for the replenishment to occur, a heating cycle is again initiated, to cause at least a portion of the liquid coolant in the reservoir to be rejected from the reservoir into the loop at junction point 32, whereupon check valve 220 closes, check valve 34 opens, and the liquid coolant is again pumped toward wick 16. Repetition of the heating and cooling cycles creates a net pumping action by which liquid coolant is forced toward the wick. When the liquid coolant reaches and saturates the wick, normal capillary-pumped operation can resume.

The simple ball check valve described in conjunction with one embodiment of the invention ensures very high reliability. However, the described system may instead use any reliable check valve, with or without a means of preloading the valve to a normally closed position. Although the inclusion of moving mechanical parts in the form of the check-valve balls reduces the apparent statistical summation of the system component reliabilities, the invention increases the overall system performance and operational reliability. The system operating characteristics also help to assure reliable check valve operation by providing significant system pressure gradients which assist the opening and closing of the check valves. The augmentation pump according to the invention uses the heated/cooled reservoir according to the prior art, together with only two additional moving parts, namely the balls of the ball-type check valves. The nature of the check valves is such that failure is unlikely, and even if a check valve fails to an open state (a state allowing fluid flow), the system can continue to pump in the capillary-pumped mode. An additional advantage of the described auxiliary pumped system is that, if a check valve should perchance fail closed, heating of the reservoir can produce significant pressure tending to force the stuck valve open. For example, if check valve 220 of FIG. 2 should fail in the closed state, cooling of reservoir 38 can reduce the pressure at junction 32, since normally-operating check valve 34 will also close. This creates a condition in which differential pressures as high as hundreds of PSI may be achieved, which may well force stuck valve 220 open. Even if it stays open thereafter, capillary pumping can continue. Similarly, if check valve 34 of FIG. 2 fails closed, while check valve 220 operates normally, heating of reservoir 38 will produce a differential pressure across the stuck valve which is significantly greater than the pressure experienced in normal operation, which may cause it to open.

FIG. 3a illustrates details of one embodiment of a check valve which may be used in the arrangements of FIGS. 1a or 2. For definiteness, check valve 34 of FIG. 1a is represented. In FIG. 3a, check valve 34 includes a housing 310 welded to pipes 30b and 36, which defines an elongated cylindrical cavity 312, which communicates with the bore 330 of pipes 30b and 36. Cavity 312 has inside threads 314 over a portion of its length. A seat body 320 has an elongated form, defines a bore 322, and is threaded on its exterior with threads 324 to match threads 314. Seat body 320 is retained in position inside cavity 312 by mated threads 314 and 324. The diameter of bore 322 of seat body 320 is dimensioned to match that of bore 330 of pipes 30*b* and 36, to minimize flow restriction.

In FIG. 3*a*, the ball 350 of the ball-type check valve is illustrated by solid lines at a first location, and as dash lines in a second location, at which the ball is designated 350*b*. A conical or curved surface 348 acts as a first seat, and provides a line contact when ball 350 bears against it, thereby preventing the flow of coolant. The right end of seat body 320 in FIG. 3*a*, better illustrated in FIG. 3*b*, defines a second seat 340 for ball 350. Ball-engaging surface 340 defined by seat body 320 has a conical or funnel shape. This funnel shape would, if not modified, cause check valve 34 to assume a blocking state for both directions of coolant flow. Flow of coolant fluid is allowed when ball 350 contacts seat 340 by a plurality of slots or castellations 342. As illustrated in FIG. 3*b*, there are three castellations designated 342*a*, 342*b*, and 342*c*. The number and shape of such castellations may be varied, but should be sufficient to allow coolant flow with minimum restriction.

As mentioned, it is very desirable that a heat transfer loop be capable of test in a one-gravity Earth environment, and to be assured of operation in the microgravity of space. To this end, ball 350 of FIG. 3*a* is illustrated as including a central region 352 different from the exterior, to represent adjustment of the mass density of the ball to equal that of the coolant fluid in which it is expected to be immersed. When the mass density of the ball equals that of the surrounding liquid coolant, it has neutral buoyancy, and has no tendency to float or sink. This, in turn, allows the ball of the check valve, when operated in a gravity environment, to operate without the effect of buoyancy, and therefore approximate the mode of operation as it would be in space. If ball 350 is made from a material much more dense than the coolant fluid, such as a metal, central region 352 might be hollow. On the other hand, if ball 350 were made from a "lightweight", low mass density polymer, the ball could be "weighted" by making central region 352 from a higher density material.

FIG. 3*c* illustrates a ball 362, which might be used in the check valve of FIG. 3*a* in place of ball 350. Ball 362 is porous, with a pore size selected to allow flow of coolant vapor therethrough, while blocking the flow of liquid coolant. The ball might be made from sintered ceramic, or from any other material which has the required properties. Naturally, the porous ball may also be weighted to have neutral buoyancy.

Referring once again to FIG. 3*a*, seat body 320, as mentioned, is retained in position by mating threads 314 and 324. The "dead-band", or ball travel from seat 340 to seat 348, can be adjusted by rotating seat body 320, to cause seat body 320 to move axially through chamber 312 defined by check valve body 310. For high reliability, check valve body 310 is welded closed after the valve is assembled. However, dead-band adjustment may be desirable after assembly. In order to allow adjustment of the dead-band by axial adjustment of seat body, a permanent magnet 370 is mounted within seat body 320, near the walls of check valve body 310. In this position of magnet 370, a magnetic attraction can be established between an adjustment magnet, illustrated as 372, placed near body 310. Rotation of adjustment magnet 372 about body 310 can cause a corresponding rotation of seat body 320, which, by virtue of threads 314 and 324, causes axial movement of seat body 320. Once the proper position of seat body 320 within chamber 312 is established, the body is swaged or dimpled adjacent the seat body, as suggested by swaged region 376, to lock the seat body in the desired position.

In a two phase liquid/vapor cooling system, the high latent heat of vaporization of the coolant liquid allows a capillary pump system to operate with low liquid flow rates. In a two phase cooling system, the high ratio of liquid density to vapor density allows the augmentation pump to displace liquid by the generation of a small quantity of vapor. The wick design in a capillary pumped system must include liquid storage capabilities to assure dynamic system performance. The liquid storage capacity of the wick allows the augmentation pump of the invention to maintain system operation in a pulsed mode, similar to the operation of the human heart for blood circulation. Although it is advantageous to have no mechanical moving parts in the capillary pumped cooling system, the system is a closed loop in which continuous flow occurs, requiring both liquid and vapor movement. Heat transfer will cease if the liquid transport system fails to maintain the capillary wick in a wetted condition. The inclusion of the check valves also controls the direction of the liquid movement from the reservoir. This allows the heat transport system to be started rapidly without flooding the vapor pipes. Flooding the system vapor pipes increases the difficulty of heat transport start up. Although a capillary pumped heat transfer system with no mechanical moving parts is desirable, overall system reliability is improved by the invention. The augmented capillary pumped heat transfer system incorporating a robust pump provides a system with a high reliability and tolerance to contamination and non-condensible gas. Wetting of the capillary wick may undesirably be prevented in the event that non-condensible gas becomes trapped at the location where liquid enters the capillary wick. The augmentation pump has the capability to force liquid past a non-condensible gas bubble (a NCG slug) and may be able to generate sufficient pressure to force the non-condensible gas through the porous wick material. A system including an augmentation pump according to the invention has reliability and tolerance to contamination and non-condensible gas which exceeds the capabilities of capillary-pump-only systems known to the inventor, regardless of wick materials. The augmentation pump therefore provides a significant enhancement to the conventional capillary pumped heat transport system, by providing both higher system pumping pressure capability, to ensure rapid reprime of the capillary pumped system in the event of a wick deprime, to aid rapid system start-up and to enable ground testing of typical spacecraft designs.

Other embodiments of the invention will be apparent to those skilled in the art. For example, while the ball of the check valve is described as being spherical, it may also be cylindrical, conical, or partially spherical, where it contacts the seat. While the heating and cooling commands have been described as individually emanating from an Earth station, control block 44 of FIG. 1*a* could easily be programmed to accept a "pump" command, and to autonomously generate the alternate heating and cooling of the reservoir.

What is claimed is:

1. A spacecraft, comprising:
   a payload including means for performing a desired function and in the process generating undesired heat;
   a cold plate coupled to said payload for absorbing said undesired heat therefrom, said cold plate including a liquid coolant input port, a capillary wick, and a coolant vapor outlet port, for accepting liquid coolant at said liquid coolant input port, and for wetting said wick and transferring said undesired heat to said coolant for causing said wick to transform said liquid coolant into said coolant vapor;

a heat exchanger including a coolant vapor input port and a liquid coolant output port, for receiving coolant vapor at said input port and extracting heat therefrom, for thereby condensing coolant vapor arriving at said input port of said heat exchanger into liquid coolant, which becomes available at said output port of said heat exchanger;

coolant coupling means coupled in a loop to said cold plate and to said heat exchanger, for coupling said coolant vapor from said coolant vapor output port of said cold plate to said coolant vapor input port of said heat exchanger, and for coupling said liquid coolant from said liquid coolant output port of said heat exchanger to said liquid coolant input port of said cold plate, whereby, under normal conditions of said loop, said capillary wick creates a vapor pressure which causes (a) circulation of coolant vapor through said loop from said cold plate to said heat exchanger, and (b) circulation of liquid coolant through said loop from said heat exchanger to said cold plate, and whereby, under other conditions, said capillary wick may become deprimed, thereby impeding circulation of coolant through said loop;

said coolant coupling means further comprising a coolant pump including (a)

a coolant reservoir including an input/output port coupled to said loop at a first location between said liquid coolant output port of said heat exchanger and said liquid coolant input port of said cold plate, for, when heated, rejecting liquid coolant from said reservoir into said loop at said first location, and for, when cooled, withdrawing liquid coolant from said loop; (b) a first check valve coupled in said loop at a second location lying between said first location and said liquid coolant input port of said cold plate, oriented for allowing flow of liquid coolant through said loop in a direction toward said cold plate, and for blocking flow of liquid coolant from said cold plate; (c) a second check valve coupled in said loop at a third location, and oriented to allow coolant flow through said loop in said first direction; and (d) heat control means coupled to said coolant reservoir for controllably heating and cooling said reservoir during corresponding heating and cooling cycles, for thereby rejecting liquid coolant into said loop at said first location during heating cycles whereby liquid coolant tends to be driven through said first check valve toward said cold plate, and for withdrawing liquid coolant from said loop at said first location during cooling cycles, whereby said first check valve tends to close and said second check valve to open, thereby tending to draw coolant toward said first location from said second check valve, whereby successive heating and cooling cycles tend to develop a fluid pressure which tends to pump said liquid coolant toward said cold plate, which may wet said capillary wick.

2. A spacecraft according to claim 1, wherein said third location lies between said liquid output port of said heat exchanger and said first location.

3. A spacecraft, comprising:

a payload including means for performing a desired function and in the process generating undesired heat;

a cold plate coupled to said payload for absorbing said undesired heat therefrom, said cold plate including a liquid coolant input port, a capillary wick, and a coolant vapor outlet port, for accepting liquid coolant at said liquid coolant input port, and for wetting said wick and transferring said undesired heat to said coolant for causing said wick to transform said liquid coolant into said coolant vapor;

a heat exchanger including a coolant vapor input port and a liquid coolant output port, for receiving coolant vapor at said input port and extracting heat therefrom, for thereby condensing coolant vapor arriving at said input port of said heat exchanger into liquid coolant, which becomes available at said output port of said heat exchanger;

coolant coupling means coupled in a loop to said cold plate and to said heat exchanger, for coupling said coolant vapor from said coolant vapor output port of said cold plate to said coolant vapor input port of said heat exchanger, and for coupling said liquid coolant from said liquid coolant output port of said heat exchanger to said liquid coolant input port of said cold plate, whereby, under normal conditions of said loop, said capillary wick creates a vapor pressure which causes (a) circulation of coolant vapor through said loop from said cold plate to said heat exchanger, and (b) circulation of liquid coolant through said loop from said heat exchanger to said cold plate, and whereby, under other conditions, said capillary wick may become deprimed, thereby impeding circulation of coolant through said loop;

said coolant coupling means further comprising a coolant pump including (a)

a coolant reservoir including an input/output port coupled to said loop at a first location between said liquid coolant output port of said heat exchanger and said liquid coolant input port of said cold plate, for, when heated, rejecting liquid coolant from said reservoir into said loop at said first location, and for, when cooled, withdrawing liquid coolant from said loop; (b) a first check valve coupled in said loop at a second location lying between said first location and said liquid coolant input port of said cold plate, oriented for allowing flow of liquid coolant through said loop in a direction toward said cold plate, and for blocking flow of liquid coolant from said cold plate; (c) a second check valve coupled in said loop at a third location, and oriented to allow coolant flow through said loop in said first direction; and (d) heat control means coupled to said coolant reservoir for controllably heating and cooling said reservoir during corresponding heating and cooling cycles, for thereby rejecting liquid coolant into said loop at said first location during heating cycles whereby liquid coolant tends to be driven through said first check valve toward said cold plate, and for withdrawing liquid coolant from said loop at said first location during cooling cycles, whereby said first check valve tends to close and said second check valve to open, thereby tending to draw coolant toward said first location from said second check valve, whereby successive heating and cooling cycles tend to develop a fluid pressure which tends to pump said liquid coolant toward said cold plate, which may wet said capillary wick; and wherein at least one of said first and second check valves is a ball-type check valve, in which the mass density of said ball equals the mass density of said coolant liquid.

4. A spacecraft according to claim 3, wherein said ball is porous, for, in a closed state, blocking the passage of liquid coolant, and allowing passage of coolant vapor.

5. A spacecraft comprising:

a payload including means for performing a desired function and in the process generating undesired heat;

a cold plate coupled to said payload for absorbing said undesired heat therefrom, said cold plate including a liquid coolant input port, a capillary wick, and a coolant vapor outlet port, for accepting liquid coolant at said liquid coolant input port, and for wetting said wick and transferring said undesired heat to said coolant for causing said wick to transform said liquid coolant into said coolant vapor;

a heat exchanger including a coolant vapor input port and a liquid coolant output port, for receiving coolant vapor at said input port and extracting heat therefrom, for thereby condensing coolant vapor arriving at said input port of said heat exchanger into liquid coolant, which becomes available at said output port of said heat exchanger;

coolant coupling means coupled in a loop to said cold plate and to said heat exchanger, for coupling said coolant vapor from said coolant vapor output port of said cold plate to said coolant vapor input port of said heat exchanger, and for coupling said liquid coolant from said liquid coolant output port of said heat exchanger to said liquid coolant input port of said cold plate, whereby, under normal conditions of said loop, said capillary wick creates a vapor pressure which causes (a) circulation of coolant vapor through said loop from said cold plate to said heat exchanger, and (b) circulation of liquid coolant through said loop from said heat exchanger to said cold plate, and whereby, under other conditions, said capillary wick may become deprimed, thereby impeding circulation of coolant through said loop;

said coolant coupling means further comprising a coolant pump including (a)

a coolant reservoir including an input/output port coupled to said loop at a first location between said liquid coolant output port of said heat exchanger and said liquid coolant input port of said cold plate, for, when heated, rejecting liquid coolant from said reservoir into said loop at said first location, and for, when cooled, withdrawing liquid coolant from said loop; (b) a first check valve coupled in said loop at a second location lying between said first location and said liquid coolant input port of said cold plate, oriented for allowing flow of liquid coolant through said loop in a direction toward said cold plate, and for blocking flow of liquid coolant from said cold plate; (c) a second check valve coupled in said loop at a third location, and oriented to allow coolant flow through said loop in said first direction; and (d) heat control means coupled to said coolant reservoir for controllably heating and cooling said reservoir during corresponding heating and cooling cycles, for thereby rejecting liquid coolant into said loop at said first location during heating cycles whereby liquid coolant tends to be driven through said first check valve toward said cold plate, and for withdrawing liquid coolant from said loop at said first location during cooling cycles, whereby said first check valve tends to close and said second check valve to open, thereby tending to draw coolant toward said first location from said second check valve, whereby successive heating and cooling cycles tend to develop a fluid pressure which tends to pump said liquid coolant toward said cold plate, which may wet said capillary wick; and wherein one of said first and second check valves is a ball-type check valve, and further including a magnet arrangement for adjusting the dead-band of said one of said first and second check valves.

6. A spacecraft according to claim 1, wherein said fluid reservoir stores a quantity of said coolant in the form of both liquid and vapor.

7. A liquid pumping arrangement, comprising:

a source of liquid including a liquid output port;

a utilization apparatus including a liquid input port, which under some conditions may itself develop a tendency to pump;

controllable coupling means coupled to said source of liquid and to said utilization apparatus, for coupling said liquid from said source of liquid to said utilization apparatus, and controllable for pumping said liquid from said source of liquid to said utilization apparatus, said coupling means comprising; (a) a pipe for the flow of liquid between said source of liquid and said utilization apparatus, (b) a fluid reservoir including an input/output port coupled to said pipe at a first location lying between said source of liquid and said utilization apparatus, for, when heated, rejecting liquid from said reservoir into said pipe at said first location, and for, when cooled, withdrawing liquid from said pipe; (b) a first check valve coupled in said pipe at a second location lying between said first location and said utilization apparatus, oriented for allowing flow of said liquid through said pipe in a direction toward said utilization apparatus, and for blocking flow of liquid from said utilization apparatus toward said first location; (c) a second check valve coupled to allow fluid flow from said source of liquid toward said first location, and to block fluid flow from said first location toward said source of liquid; and (d) heat control means coupled to said reservoir for controllably heating and cooling said reservoir during corresponding heating and cooling cycles, for thereby rejecting liquid into said loop at said first location during heating cycles whereby liquid tends to be driven through said first check valve toward said utilization apparatus, and for withdrawing liquid from said pipe at said first location during cooling cycles, whereby said first check valve tends to close and said second check valve to open, thereby tending to draw said liquid toward said first location from said source of liquid, whereby successive heating and cooling cycles tend to develop a fluid pressure which tends to pump said liquid toward said utilization apparatus, and whereby, when said utilization apparatus pumps, said first and second check valves open to allow said liquid to flow toward said utilization apparatus; wherein, in said liquid pumping arrangement:

said liquid is a coolant;

said utilization apparatus comprises a capillary wick which absorbs heat from a cold plate, and which, when wetted by said liquid coolant, generates coolant vapor at a coolant vapor output port which, in turn, generates said tendency to pump;

said source of liquid is a heat exchanger which includes a coolant vapor input port, and extracts heat therefrom to produce said liquid coolant; and said coupling means comprises a path for the flow of said coolant vapor from said coolant vapor output port of said utilization means to said coolant vapor input port of said source of liquid.

8. A liquid pumping arrangement according to claim 7, wherein said second check valve is located in said pipe at a location lying between said first location and said liquid coolant output port of said source of liquid.

9. A liquid pumping arrangement according to claim 7, wherein at least one of said check valves is a ball-type check valve.

10. A liquid pumping arrangement according to claim 9, wherein said ball of said one of said ball-type check valves is porous, for, when said one of said ball-type check valves is in a closed state, allowing the flow of vapor, but not liquid, through said one of said ball-type check valves.

11. A liquid pumping arrangement, comprising:
a source of liquid including a liquid output port;
a utilization apparatus including a liquid input port, and which under some conditions may itself develop a tendency to pump;
controllable coupling means coupled to said source of liquid and to said utilization apparatus, for coupling said liquid from said source of liquid to said utilization apparatus, and controllable for pumping said liquid from said source of liquid to said utilization apparatus, said coupling means comprising; (a) a pipe for the flow of liquid between said source of liquid and said utilization apparatus, (b) a fluid reservoir including an input/output port coupled to said pipe at a first location lying between said source of liquid and said utilization apparatus, for, when heated, rejecting liquid from said reservoir into said pipe at said first location, and for, when cooled, withdrawing liquid from said pipe; (b) a first check valve coupled in said pipe at a second location lying between said first location and said utilization apparatus, oriented for allowing flow of said liquid through said pipe in a direction toward said utilization apparatus, and for blocking flow of liquid from said utilization apparatus toward said first location; (c) a second check valve coupled to allow fluid flow from said source of liquid toward said first location, and to block fluid flow from said first location toward said source of liquid; and (d) heat control means coupled to said reservoir for controllably heating and cooling said reservoir during corresponding heating and cooling cycles, for thereby rejecting liquid into said loop at said first location during heating cycles whereby liquid tends to be driven through said first check valve toward said utilization apparatus, and for withdrawing liquid from said pipe at said first location during cooling cycles, whereby said first check valve tends to close and said second check valve to open, thereby tending to draw said liquid toward said first location from said source of liquid, whereby successive heating and cooling cycles tend to develop a fluid pressure which tends to pump said liquid toward said utilization apparatus, and whereby, when said utilization apparatus pumps, said first and second check valves open to allow said liquid to flow toward said utilization apparatus; and
wherein at least one of said check valves is a ball-type check valve, and wherein said one of said ball-type check valves includes a magnet arrangement for adjusting the dead-band of said check valve.

12. A liquid pumping arrangement, comprising:
a source of liquid including a liquid output port;
a utilization apparatus including a liquid input port, and which under some conditions may itself develop a tendency to pump;
controllable coupling means coupled to said source of liquid and to said utilization apparatus, for coupling said liquid from said source of liquid to said utilization apparatus, and controllable for pumping said liquid from said source of liquid to said utilization apparatus, said coupling means comprising; (a) a pipe for the flow of liquid between said source of liquid and said utilization apparatus, (b) a fluid reservoir including an input/output port coupled to said pipe at a first location lying between said source of liquid and said utilization apparatus, for, when heated, rejecting liquid from said reservoir into said pipe at said first location, and for, when cooled, withdrawing liquid from said pipe; (b) a first check valve coupled in said pipe at a second location lying between said first location and said utilization apparatus, oriented for allowing flow of said liquid through said pipe in a direction toward said utilization apparatus, and for blocking flow of liquid from said utilization apparatus toward said first location; (c) a second check valve coupled to allow fluid flow from said source of liquid toward said first location, and to block fluid flow from said first location toward said source of liquid; and (d) heat control means coupled to said reservoir for controllably heating and cooling said reservoir during corresponding heating and cooling cycles, for thereby rejecting liquid into said loop at said first location during heating cycles whereby liquid tends to be driven through said first check valve toward said utilization apparatus, and for withdrawing liquid from said pipe at said first location during cooling cycles, whereby said first check valve tends to close and said second check valve to open, thereby tending to draw said liquid toward said first location from said source of liquid, whereby successive heating and cooling cycles tend to develop a fluid pressure which tends to pump said liquid toward said utilization apparatus, and whereby, when said utilization apparatus pumps, said first and second check valves open to allow said liquid to flow toward said utilization apparatus;
wherein:
said liquid is a coolant;
said utilization apparatus comprises a capillary wick which absorbs heat from a cold plate, and which, when wetted by said liquid coolant, generates coolant vapor at a coolant vapor output port;
said source of liquid is a heat exchanger which includes a coolant vapor input port, and extracts heat therefrom to produce said liquid coolant; and
said coupling means comprises a path for the flow of said coolant vapor from said coolant vapor output port of said utilization means to said coolant vapor input port of said source of liquid; and further comprising
spacecraft payload apparatus coupled to said cold plate for, in association with its intended function, generating heat, which is removed by said cold plate; and wherein
at least one of said check valves is a ball-type check valve, in which said ball has the same mass density as said coolant, whereby the action of said check valve is the same in a microgravity environment and in a gravity environment, thereby allowing testing of said liquid pumping arrangement on Earth before launch into space.

13. A liquid pumping arrangement according to claim 12, wherein said ball of said one of said ball-type check valves is porous, for, when said one of said ball-type check valves is in a closed state, allowing the flow of vapor, but not liquid, through said one of said ball-type check valves.

14. A liquid pumping arrangement according to claim 12, wherein said one of said ball-type check valves includes a magnet arrangement for adjusting the dead-band of said check valve.

15. An apparatus, comprising:
- a powered unit including means for performing a desired function and in the process generating undesired heat;
- a cold plate coupled to said powered unit for absorbing said undesired heat therefrom, said cold plate including a liquid coolant input port, a capillary wick, and a coolant vapor outlet port, for accepting liquid coolant at said liquid coolant input port, and for wetting said wick and transferring said undesired heat to said coolant for causing said wick to transform said liquid coolant into said coolant vapor;
- a heat exchanger including a coolant vapor input port and a liquid coolant output port, for receiving coolant vapor at said input port and extracting heat therefrom, for thereby condensing coolant vapor arriving at said input port of said heat exchanger into liquid coolant, which becomes available at said output port of said heat exchanger;
- coolant coupling means coupled in a loop to said cold plate and to said heat exchanger, for coupling said coolant vapor from said coolant vapor output port of said cold plate to said coolant vapor input port of said heat exchanger, and for coupling said liquid coolant from said liquid coolant output port of said heat exchanger to said liquid coolant input port of said cold plate, whereby, under normal conditions of said loop, said capillary wick creates a vapor pressure which causes (a) circulation of coolant vapor through said loop from said cold plate to said heat exchanger, and (b) circulation of liquid coolant through said loop from said heat exchanger to said cold plate, whereby said cold plate, said heat exchanger, and said coolant coupling means together constitute a capillary pump and liquid flow loop, and whereby, under other conditions, said capillary wick may become deprimed, thereby effectively disabling said capillary pump, and impeding circulation of coolant through said loop;
- said coolant coupling means further comprising a further coolant pump including (a)
- a coolant reservoir including an input/output port coupled to said loop at a first location between said liquid coolant output port of said heat exchanger and said liquid coolant input port of said cold plate, for, when heated, rejecting liquid coolant from said reservoir into said loop at said first location, and for, when cooled, withdrawing liquid coolant from said loop; (b) a first check valve coupled in said loop at a second location lying between said first location and said liquid coolant input port of said cold plate, oriented for allowing flow of liquid coolant through said loop in a direction toward said cold plate, and for blocking flow of liquid coolant from said cold plate; (c) a second check valve coupled in said loop at a third location, and oriented to allow coolant flow through said loop in said first direction; and (d) heat control means coupled to said coolant reservoir for controllably heating and cooling said reservoir during corresponding heating and cooling cycles, for thereby rejecting liquid coolant into said loop at said first location during heating cycles whereby liquid coolant tends to be driven through said first check valve toward said cold plate, and for withdrawing liquid coolant from said loop at said first location during cooling cycles, whereby said first check valve tends to close and said second check valve to open, thereby tending to draw coolant toward said first location from said second check valve, whereby successive heating and cooling cycles tend to develop a fluid pressure which tends to pump said liquid coolant toward said cold plate, which may wet said capillary wick.

* * * * *